Sept. 12, 1939.    J. EDWARDES ET AL    2,172,466
MOLD
Filed May 14, 1937
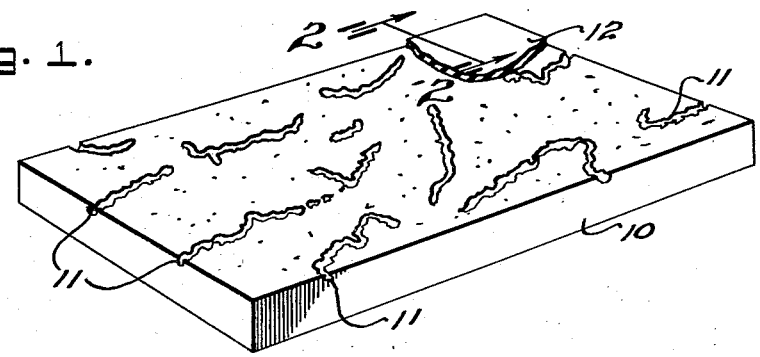
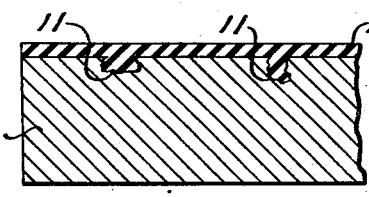 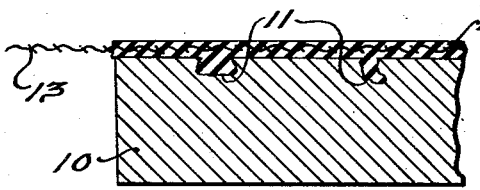
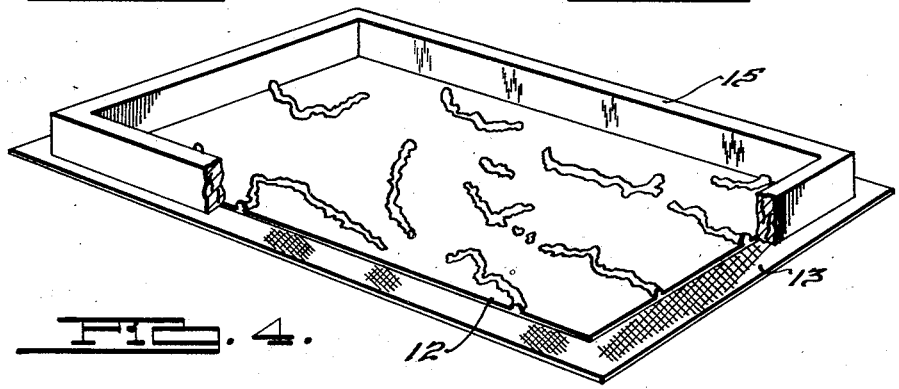
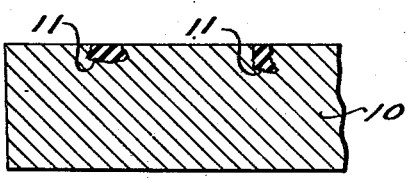 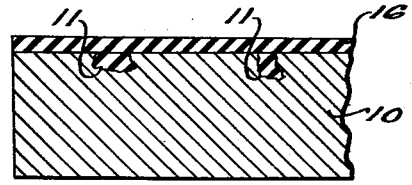
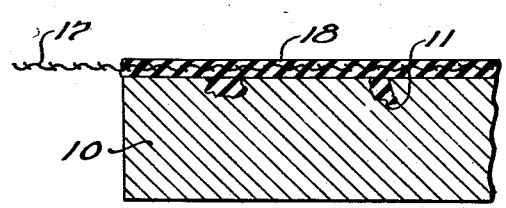
INVENTORS.
John Edwardes,
BY Stanley R. DuBrie.
Harness, Dickey & Pierce
ATTORNEYS.

Patented Sept. 12, 1939

2,172,466

UNITED STATES PATENT OFFICE 2,172,466

MOLD

John Edwardes and Stanley R. Du Brie, Detroit, Mich.

Application May 14, 1937, Serial No. 142,648

2 Claims. (Cl. 18—61)

The present invention relates to a novel elastic mold structure and to a process of forming the same. More particularly, it relates to a novel process for the formation of resilient elastic mold structures which, while having many other uses, are primarily adapted for the reproduction of irregular surfaces such as are found to occur in slabs of natural stone such, for example, as in certain types of marble.

The present invention has for an object a process which serves to provide a mold structure which may subsequently be used to produce artificial slabs or plaques having surface irregularities and configurations substantially identical with the master plaque from which the mold was originally formed.

It is a still further object of the present invention to provide an elastic mold structure invention which, upon completion, provides a particularly faithful reproduction of even the minor surface irregularities in the master panel from which the mold was formed.

Yet another object of the present invention resides in a process for forming mold structures which process is relatively cheap, extremely simple to practice, and which inherently results in a singularly faithful reproduction of the particular surface it is desired to reproduce.

Many other and further objects, advantages, and features of the present invention will become clearly apparent from the following specification when considered in connection with the accompanying drawing forming a part thereof.

In the drawing:

Figure 1 is a perspective view of a master plaque or slab illustrating one type of material from which one of the improved mold structures may be produced.

Fig. 2 is an enlarged, fragmentary, transverse, sectional view taken substantially on the line 2—2 of Fig. 1 illustrating in detail the cross-sectional configuration of the slab having a coating of latex thereon.

Fig. 3 is a transverse sectional view similar to Fig. 2 illustrating the additional latex material applied to the slab to form the mold.

Fig. 4 is a perspective view with parts broken away showing a mold structure embodying the improved elastic molding element of the present invention.

Fig. 5 is a fragmentary sectional view similar to Fig. 4 illustrating one step of a modified form of the process of forming the improved elastic mold structure.

Fig. 6 is a sectional view similar to Fig. 5 illustrating an additional step in the modified form of the improved process.

Fig. 7 is a fragmentary sectional view similar to Figs. 5 and 6 illustrating the manner in which the completed mold structure may be formed by the modified process of the present invention.

While it will be readily apparent to those skilled in the art that the particular process and improved resulting article disclosed in the accompanying drawing and described in the following specification will find broad and practical utility in many fields other than the reproduction of slabs or plaques of cementitious material, it will be readily understood that the invention finds particular adaptability in this specific field.

With more particular reference to the drawing, in Fig. 1, a slab or plaque of marble or similar natural stone 10 is disclosed. As is usual in natural stone slabs and in many various types of marble, the surface of the slab contains fissures and surface imperfections of varying sizes, shapes, and configurations which are deemed to enhance the ornamental appearance of the stone. By way of illustration, Fig. 1 more or less diagrammatically discloses a plurality of these fissures or recesses 11 which are disclosed on a somewhat enlarged scale for the purpose of making the illustration more clear.

It will be of course understood that the term "latex", as used in this specification and as found in the claims, is not used in its extremely strict sense but is deemed to include, dispersions of reclaimed rubber, raw rubber, or synthetic rubber whether vulcanizable, non-vulcanizable or pre-vulcanized.

In accordance with the practice of the process of the present invention, after the surface of the slab to be reproduced has been thoroughly cleaned, a coating of liquid latex 12 may be applied directly to the upper surface of the slab, the configuration of which it is desired to reproduce. The latex should be of relatively fluid consistency and sufficient liquid latex should be applied to not only fill all of the fissures and minor surface imperfections of the slab to be reproduced but should be applied in sufficient quantity so that a substantial layer of excess liquid latex will lie over and completely cover the exposed surface of the slab. While the liquid latex is still wet and prior to the time that the same is set, a backing member or web 13 is embedded in the surplus liquid latex covering the slab. While the backing member may be, felt, wood, cardboard, asbestos, or leather, it has been found preferable to utilize a web of suitable, relatively strong, coarsely woven fibrous material such, for example, as canvas, and it has been found particularly desirable to utilize a sheet of substantially larger dimensions than the slab being reproduced in order that the marginal edges of the web will extend beyond the marginal edges of the slab of which the reproduction is being made. When this canvas or other woven fibrous material is placed upon the latex 12 covering the face of the slab, the latex will soak into the canvas and become firmly bonded thereto as the liquid latex material sets or dries out.

After the liquid latex material has completely set, the canvas and latex together may be removed from the slab 10 and it has been found that the fissures and other minor surface imperfections in the slab are faithfully reproduced in the latex material which, as has been explained above, has hardened and become bonded to the fibrous backing web 13. It will, of course, be readily understood that the latex material after the same has set still retains a very substantial resiliency and consequently, it is possible to remove the latex material from the slab despite the fact that some of the fissures may be undercut or recessed in such a manner that a rigid molding plastic could not possibly be removed from the slab.

After the mold structure has been removed from the master slab, the same may be placed face upwardly upon a suitable surface in the manner illustrated in Fig. 4. The mold structure then may be surrounded by a suitable frame 15 having a height equivalent to the thickness of the slab it is desired to form and the structure thus assembled may be used as a mold for casting a cementitious replica of the master slab. The particular manner in which the mold structure is used after completion forms no part of the present invention but it will be readily appreciated that the same may be used in order to reproduce replicas of the master slab from cast cementitious material such as artificial marble and various types of synthetic stone or tile such as are well known in the art.

It will also be readily appreciated that the elastic mold structure may conveniently be removed from the surface of the cast replica after the material forming the same has set or dried out in substantially the same manner as the mold was removed from the master slab after the latex had set. As a modification of the above disclosed process, it has been found in many instances more satisfactory to first apply the liquid latex material to the surface of the master slab leaving a suitable surplus on the surface of the slab, then placing the fabric backing web over the surface of the liquid latex while the same is still wet and subsequently applying a coating of additional liquid latex to the exposed surface of the backing sheet in order that the liquid latex material will enter the fabric backing sheet from both sides thereof thus insuring a firm and positive bond between the mass of latex material and the fabric backing web.

A still further modified form of the invention is illustrated in Figs. 5, 6 and 7 of the drawing which, as described above, are cross-sectional views similar to Figs. 2 and 3. In this form of the invention, a process is employed which positively insures the entrance of the liquid latex material to all of the minute cracks, fissures, and recesses of the master slab. In this form of the invention, the master slab 10 is coated with liquid latex material sufficient to fill or partially fill all of the recesses and surface irregularities thereof without having any substantial surplus coating over the main portion of the surface of the slab. This liquid latex which has been applied in these recesses is allowed to set and after the same has set, a second coat of liquid latex material is applied to the surface of the slab thus providing a substantially uniform coating throughout the entire exposed surface of the slab to be reproduced. Prior to the setting of this second coat of liquid latex material, a fabric backing sheet 17 is applied to the wet surface of the surplus liquid latex material and additional liquid latex material 18 may be applied to the exposed surface of the fabric backing sheet thus firmly bonding the same to the mass of liquid latex material already applied.

After the liquid latex material has set, the entire mold structure is removed from the master slab 10 and utilized in substantially the same manner as has been described above in connection with the preferred embodiment of the invention.

Due to the extreme strength and resiliency of the latex material after the same has set, these molds manufactured in accordance with the process outlined above have been found to have an exceedingly long life and throughout their length of use, serve to reproduce singularly faithful and exact replicas of the master slab or panel from which the mold structure was originally formed.

It will be readily understood that the inventive concepts presented herein will find a broad and practical utility in many other applications besides the reproduction of surface imperfections of slabs of natural stone. It will be readily appreciated that all such modifications apparent to those skilled in the art are included within the scope of the present invention as defined in the subjoined claims.

What is claimed is:

1. The method of forming a mold for reproducing the surface structure of an article having irregularly shaped fissures therein, which method comprises, filling said fissures with liquid latex, allowing said latex to set, applying sufficient liquid latex to provide a substantially uniform coating over said article, and imbedding a woven fibrous backing sheet in said latex prior to the setting of the same.

2. The method of forming a mold for reproducing the surface structure of an article having irregularly shaped fissures therein, which method comprises, filling said fissures with liquid latex, allowing said latex to set, applying sufficient latex to the surface of said article to provide a uniform coating thereon, disposing a woven backing on said liquid latex prior to the setting of the same, and applying additional liquid latex to the exposed surface of said web.

JOHN EDWARDES.
STANLEY R. DU BRIE.